June 6, 1961  E. R. ALTONJI ET AL  2,987,717
ROTATING SHAFT POSITION READOUT SYSTEM
Filed Oct. 6, 1958

INVENTORS
EDMUND R. ALTONJI
EDWARD A. KUNKEL
BY Charles Baraff
AGENT

2,987,717
ROTATING SHAFT POSITION READOUT SYSTEM

Edmund R. Altonji, Pequannock, and Edward A. Kunkel, Nutley, N.J., assignors to International Telephone and Telegraph Corporation, Nutley, N.J., a corporation of Maryland
Filed Oct. 6, 1958, Ser. No. 765,591
2 Claims. (Cl. 340—347)

This invention relates in general to a continuous readout of a rotatable shaft position and more particularly for a shaft utilized in radar tracking systems.

In known systems for readout of a rotating shaft, such as utilized in azimuth, radar tracking, precision potentiometers are utilized which provide an electrical rotation of 358 degrees, ±1 degree and a linearity tolerance of ±1%. Thus two degrees of electrical rotation will be lost if this potentiometric technique is used in reading out the shaft's rotation as a D.C. voltage.

An object of the invention is to provide a rotating shaft readout system which will permit the D.C. readout voltage to be zero for zero degrees and maximum for 360 degrees of shaft rotation without introducing any discontinuity in the reading at each revolution.

A feature of the invention is a pulse system for representing shaft position wherein the pulse width corresponds to angular position of the shaft.

Another feature of the invention is a single frequency source connected to a resolver phase shifter for representing angular position of a shaft and a pulse generator for transforming the shifted sinewaves provided by the resolver into pulses of variable width for presenting a continuous readout of the shaft's position.

Referring to the figures of the drawing.

Figure 1:
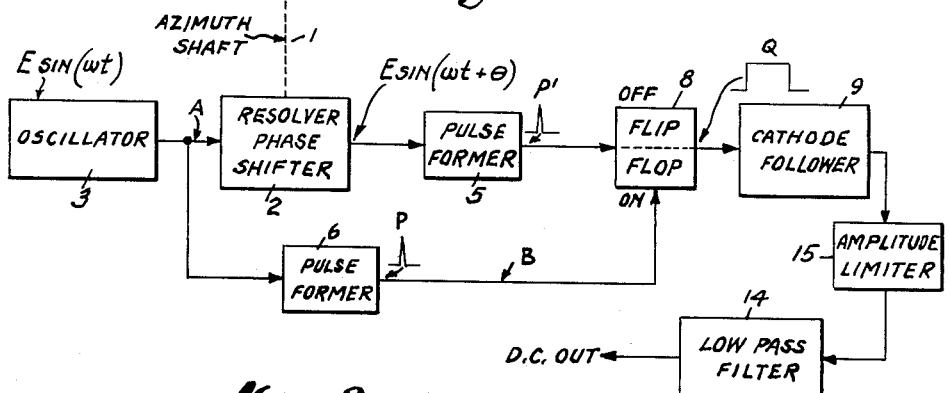
FIG. 1 is a block diagram of a pulse system for reading out a rotating shaft in terms of the corresponding width of rectangular pulses.

Referring to FIG. 1 a rotating shaft 1 is connected to a resolver phase shifter 2 driven by an oscillator 3 generating a single frequency sinewave and providing a voltage represented as $E \sin \omega t$.

The position of the rotating shaft 1 is thereby represented by the phase $\phi$ of the resolver output voltage $E \sin (\omega t + 0)$. The single frequency oscillator 3 which is used to drive the coils of the phase shifter 2 also provides in branch B of the circuit a sharp reference pulse P by means of a pulse former 6 which converts the reference sinewave to a sharp pulse.

Similarly the output of the phase shifter 2 is converted to a sharp pulse P' by a pulse former 5. Pulse P' is shifted along the time axis by an amount corresponding to the phase shift $\phi$. Various types of pulse formers 5, 6 which generate narrow pulses from a sinusoidal wave at the same frequency may be used, for example, clipper-differentiators, saturable transformers, multiar circuits, or more preferably regenerative magnetic pulse formers. Reference is made to an article entitled, "Techniques Developed for Airborne Tacan Data Link" by E. R. Altonji et al. in Electric Communications, September 1957, vol. 34 #3, page 262 for disclosure of a preferred form of magnetic pulse former. Pulse formers, disclosed in Interim Engineering Reports #6, March 1952 AN/ARN 26 (XN-1) Airborne Data Link Equipment, pages 12–15; Interim Engineering Report #7, June 1952, pages 3–22; Interim Engineering Report #8, July 1952, pages 12–13 of the U.S. Navy Bureau of Ships, Electronic Division, are likewise suitable.

Both the reference pulse P and the resolver pulse P' are fed to a flip flop circuit 8, so that the flip flop is alternately turned on by the reference pulse P and turned off by the phase shifter pulse P' coming from the resolver 2. The flip flop 8 thereby provides its cathode follower 9 a rectangular pulse Q, such that the area under the rectangular pulse Q is directly proportional to the rotating shaft position. The output of the flip flop 8 is fed into a low pass filter 14 which filters out all components except the D.C. component. Since the resulting D.C. output is directly proportional to and represents the original rotational position of the shaft, it thereby becomes a continuous measure of the shaft readout and no discontinuous readings are possible therewith.

In order to insure that the D.C. output is proportional only to the pulse (Q) duration, an amplitude limiter 15, preferably in the form of a Zener diode, is placed between the cathode follower 9 and the low pass filter 14.

Figure 2:
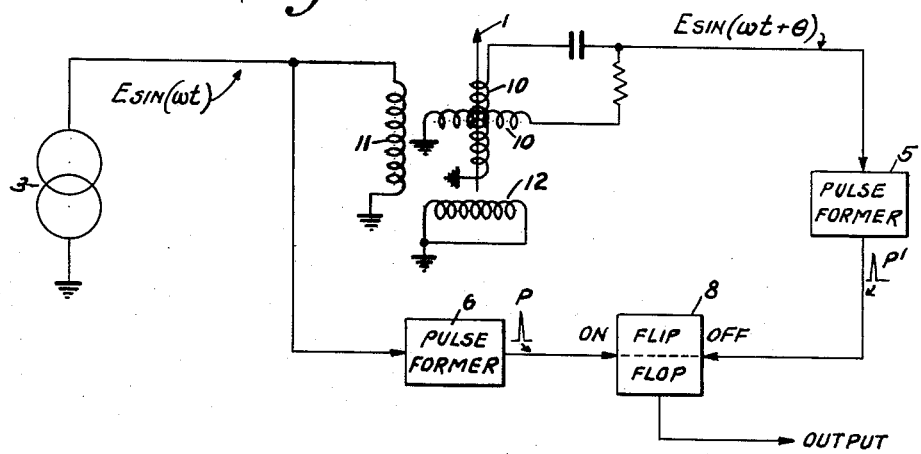
FIG. 2 is a block diagram similar essentially to FIG. 1, but showing the resolver phase shifter as a circuit component of the system.

FIG. 2 shows a circuit similar to that of FIG. 1 with the resolver coils illustrated; namely, a rotor coil 10 connected to the azimuth shaft 1 of the radar tracking system and the stator coils 11 and 12 connected as shown.

Figure 3:
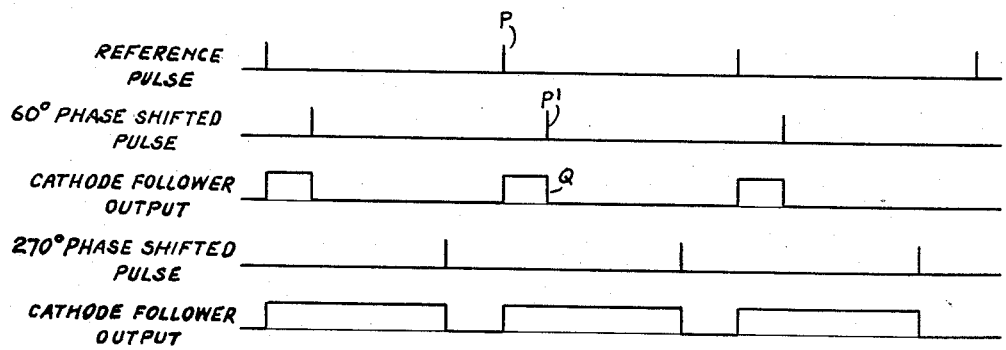
FIG. 3 shows readout wave forms provided by the rotating shaft at the output of the pulse converter.

FIG. 3 shows the readout wave forms produced in the shaft readout system. Pulse P is a sharp reference pulse derived from the sinewave generator 3 and pulse former 6. Pulse P' represents the pulse shifted in time position as derived from the resolver 2 and pulse former 5. The rectangular pulse Q which is derived from the flip flop 8 and cathode follower 9 has a width proportional to the rotating shaft position being narrower for a 60 degree position and wider for a 270 degree position. These two conditions are represented in FIG. 3, as shown. Since the output of the cathode follower is stabilized by the amplitude limiter 15, then the voltage is directly proportional to the duration of the pulses Q which are a function only of the phase shift $\phi$.

The only remaining positions of the shaft which are of interest are the crucial positions when the shaft angle is very close to zero, that is, slightly above zero or slightly below 360 degrees. In these situations the flip flop 8 must be set and reset very rapidly and the minimum increments which can be read out are then determined by the reset time or rise time of the flip flop circuit.

If the set and reset time of the flip flop 8 be set at a minimum of 0.5 microsecond, then the frequency required of the reference oscillator 3 can be correspondingly determined by one part in 3600 of the period of the reference pulses for a ±0.1 degree accuracy. This indicates a reference oscillator frequency of 280 cycles or a period of 3575 microseconds. A frequency of higher than this value will give poorer performance around the zero point and a frequency lower will give better performance around the zero point.

It is to be understood that the above-described arrangements are illustrative of the application of the principles of the invention. Numerous other arrangements may be devised by those skilled in the art without departing from the spirit and scope of the invention.

Thus, it should be appreciated by those skilled in the art that the disclosed pulse width representation of a rotating shaft position may be also utilized to provide a digital indication thereof. Such an alternative system would omit the D.C. output conversion step subsequent to the flip flop and cathode follower action, and instead provide gating the Q pulses with the pulses of a high frequency clock to register the resultant pulse count on a counter of known construction.

We claim:

1. In a rotating shaft readout system for continuously representing angular position of the shaft, a single frequency oscillator, parallel electrical paths connected thereto, a resolver phase shifter connected to the rotating shaft, a narrow pulse former in each path, a flip-flop circuit connected to the output of each pulse former, whereby said flip-flop circuit is adapted to be set and reset by said narrow pulses, means for deriving from said flip-flop a rectangular pulse of variable width proportional to the phase shifted output of said generator, for providing a continuous readout of the shaft's position, means including a cathode follower and an amplitude limiter coupled to said flip-flop circuit, and a low pass filter coupled to said amplitude limiter for filtering out all components from said rectangular pulse except the D.C. component.

2. The rotating shaft readout system of claim 1, wherein said resolver phase shifter is variable and has a rotor coil connected to the rotating shaft and stator coils coupled to said generator.

References Cited in the file of this patent

UNITED STATES PATENTS

| | | |
|---|---|---|
| 2,682,045 | Crost | June 22, 1954 |
| 2,717,987 | Hagen | Sept. 13, 1955 |

OTHER REFERENCES

"Notes on Analog-Digital Conversion Techniques," A. Susskind, 1957, pp. 6–8 through 6–12.